United States Patent [19]

Turnbull et al.

[11] Patent Number: 5,559,708
[45] Date of Patent: Sep. 24, 1996

[54] COMPUTER CONTROLLED FLEXIBLE MANUFACTURING OF ALUMINUM ARTICLES

[75] Inventors: G. Keith Turnbull, Pittsburgh; Eileen M. Peretic, Murrysville; George T. Rogan, New Kensington; John H. Powers, Lower Burrell; Scot R. Fugger, Monroeville; Daniel A. Sullivan, Jr., Upper Burrell Township, Westmoreland County, all of Pa.

[73] Assignee: Aluminum Company of America, Pittsburgh, Pa.

[21] Appl. No.: 41,243

[22] Filed: Apr. 1, 1993

Related U.S. Application Data

[63] Continuation-in-part of Ser. No. 598,763, Oct. 15, 1990, abandoned.

[51] Int. Cl.⁶ ............................ G06F 19/00; G06F 17/50
[52] U.S. Cl. .............................. 364/468.03; 364/468.04; 364/472.01; 364/512
[58] Field of Search ................................. 364/468, 469, 364/472, 478, 470, 512, 400, 401–403, 130, DIG. 1, DIG. 2; 235/385; 379/100; 395/103, 108, 114

[56] References Cited

U.S. PATENT DOCUMENTS

| | | | |
|---|---|---|---|
| 3,225,037 | 6/1966 | Knight et al. | 117/105.3 |
| 3,637,989 | 1/1972 | Howard et al. | 235/385 |
| 3,739,742 | 6/1973 | Racz et al. | 118/2 |
| 3,867,882 | 2/1975 | Ahlgren et al. | 346/75 |
| 3,874,949 | 4/1975 | Kaneda et al. | 427/259 X |
| 3,989,003 | 11/1976 | Fagan et al. | 18/2 |
| 4,031,275 | 6/1977 | Alexander | 427/248 R |
| 4,103,048 | 6/1978 | Alexander | 427/248 R |
| 4,149,246 | 4/1979 | Goldman | 364/900 |
| 4,179,310 | 12/1979 | Compton et al. | 427/53.1 X |
| 4,332,012 | 5/1982 | Sekine et al. | 364/468 |
| 4,362,124 | 12/1982 | Fleig | 118/698 |
| 4,393,450 | 7/1983 | Jerard | 364/474.24 |
| 4,419,384 | 12/1983 | Kane et al. | 427/57 |
| 4,459,663 | 7/1984 | Dye | 364/403 |
| 4,472,783 | 9/1984 | Johnstone et al. | 364/478 |
| 4,490,440 | 12/1984 | Reber | 428/620 |
| 4,511,970 | 4/1985 | Okano et al. | 364/401 |
| 4,569,421 | 2/1986 | Sandstedt | 364/401 |
| 4,598,376 | 7/1986 | Burton et al. | 364/900 |
| 4,599,626 | 7/1986 | Rich | 346/140 R |
| 4,604,329 | 8/1986 | Reber | 428/620 |
| 4,636,950 | 1/1987 | Caswell et al. | 364/403 |
| 4,640,529 | 2/1987 | Katz | 281/5 |
| 4,656,591 | 4/1987 | Goldberg | 364/478 |
| 4,659,876 | 4/1987 | Sullivan et al. | 379/100 |
| 4,725,511 | 2/1988 | Reber | 428/620 |
| 4,742,464 | 5/1988 | Duret et al. | 364/474.24 |
| 4,752,352 | 6/1988 | Feygin | 156/634 X |

FOREIGN PATENT DOCUMENTS

| | | | |
|---|---|---|---|
| 2127582 | 4/1984 | United Kingdom | 364/478 |

OTHER PUBLICATIONS

"Software Architecture for Materials Handling System," IBM Technical Disclosures Bulletin, vol. 28, No. 1, pp. 190–192; Jun. 1985.

*The Random House College Dictionary*, Revised Edition, 1980, p. 1262.

Petre—"How to Keep Customers Happy Captives"—*Fortune*—Sep. 2, 1985—pp. 42–46.

Gatty—"Setting Up Shop On Computer Screens"—*Nation's Business*—Mar. 1984, pp. 57–58.

*Primary Examiner*—Joseph Ruggiero
*Attorney, Agent, or Firm*—Douglas P. Mueller; William D. Miller; Daniel A. Sullivan, Jr.

[57] ABSTRACT

A system and method for computer controlled flexible manufacturing of aluminum articles having patterns thereon is disclosed. The pattern is digitized or otherwise reduced to computer-readable format and then printed onto an aluminum article under computer control. The pattern is preferably printed using an ink jet, dot matrix color printer which has been modified to feed the aluminum substrate in an essentially flat manner. The pattern can be sealed within the anodized coating of the aluminum article for permanence.

2 Claims, 2 Drawing Sheets

5,559,708

COMPUTER CONTROLLED FLEXIBLE MANUFACTURING OF ALUMINUM ARTICLES

This is a continuation-in-part of U.S. Ser. No. 07/598,763, filed Oct. 15, 1990, now abandoned, the contents of which are incorporated herein by reference.

FIELD OF THE INVENTION

The present invention relates to manufacturing of aluminum articles and, more particularly, to the flexible manufacturing of such articles under computer control to create customized articles having patterns thereon.

BACKGROUND OF THE INVENTION

It is known to provide computer shopping terminals in stores and shopping malls, for example, wherein a customer can browse through a computerized catalog and order items therefrom via computer. Some such systems even allow the customer to modify the catalog items by selecting one of a number of preset options. Such a system is taught by U.S. Pat. No. 4,149,246 to Goldman which discloses a system for specifying custom garments.

In the system disclosed by Goldman, the customer inputs certain personal data, and then selects a particular style of suit from a computerized catalog. The customer may also choose from a variety of options, such as patch pockets. The computer then informs the customer if any of the selected options are considered to be unsuitable for a person of the customer's particular size and/or build. Once the particular suit is determined and the in-store financial transaction is completed, the computer sends the selected catalog information to a manufacturing computer.

Such systems are disadvantageous, however, in that the customer is limited to a certain number of predetermined options stored in the computer memory. In the system of Goldman, for example, a customer cannot select a style of garment unless the manufacturing computer already has the pattern for the style stored in memory as one of a finite number of predefined options. In this way, the article cannot be considered to be truly "customized".

This disadvantage is overcome by the invention disclosed in U.S. Ser. No. 07/598,763, abandoned, which teaches a flexible computer-controlled manufacturing system for producing customized articles. According to this disclosure, a customer-generated computerized specification is sent from the customer's premises to a computer in the manufacturing plant. The specification can include the customer identification, request for price, request for delivery date, graphic details of the article, and confirmation of the order. Upon receipt of such a specification, the computer in the manufacturing plant controls the manufacturing of the article. In this way, highly customized articles can be created without the need for a predefined pattern. This system can be used for producing a wide variety of customized articles, such as printed signs.

The automobile manufacturing industry has long sought the ability to paint automobile bodies on an automated assembly line. The difficulty has been that each successive automobile on the assembly line may be a different model which is to be painted a different color than the one before it. Accordingly, paint sprayers disposed at the same location may not adequately cover each successive automobile, unless the shape and size of the automobile can be taken into account.

To this end, various systems have been developed for identifying the particular model and color of automobile to be painted on the assembly line. For example, U.S. Pat. No. 3,255,037 discloses a system wherein photodetectors are used to detect the shape and size of each successive vehicle on the assembly line. The paint sprayers are then positioned according to the shape and size of the vehicle. Likewise, U.S. Pat. No. 4,419,384 discloses photosensors for detecting the size and shape of the automobile, and then the painting of the vehicle is computer controlled based on the detected information. U.S. Pat. No. 3,739,742 discloses a spray assembly memory which detects the type of article to be painted through the use of mechanical pins activated only by a certain type of article. U.S. Pat. No. 3,989,003 discloses a paint spray control system wherein an operator manually enters information regarding the type of automobile and the color to be painted, and the computer checks the inputted data with pre-programmed style and color data. U.S. Pat. No. 4,362,124 discloses that a preloaded program which allows for contour and/or shape data of the automobile to be entered.

These known systems are necessarily limited to the predefined styles and colors stored in the memory of the computer. Accordingly, these systems do not provide sufficient flexibility in manufacturing.

SUMMARY OF THE INVENTION

The present invention overcomes the above disadvantages by applying the principles of flexible manufacturing disclosed in U.S. Ser. No. 07/598,763, abandoned, to the production of customized aluminum articles, particularly anodized aluminum articles having patterns created thereon.

According to the present invention, a computerized specification for a custom aluminum article having a pattern is created on a computer and then the pattern is formed on the aluminum article under computer control according to the computerized specification. The specification may be created on a customer's computer and sent directly to the manufacturing computer, or the specification may be generated in-house. The specification contains all of the graphic details necessary to form the pattern, so the invention is not limited to predetermined graphic options offered by the manufacturing plant.

The present invention facilitates flexible manufacturing in that, from the manufacturing plant perspective, the particular pattern created and the fact that the patterns formed on a succession of articles differ from one another is unimportant. In this way, the articles can be truly customized.

BRIEF DESCRIPTION OF THE DRAWINGS

The present invention can be best understood with reference to the appended Figures, wherein.

DETAILED DESCRIPTION OF THE PREFERRED EMBODIMENTS

Figure 1:
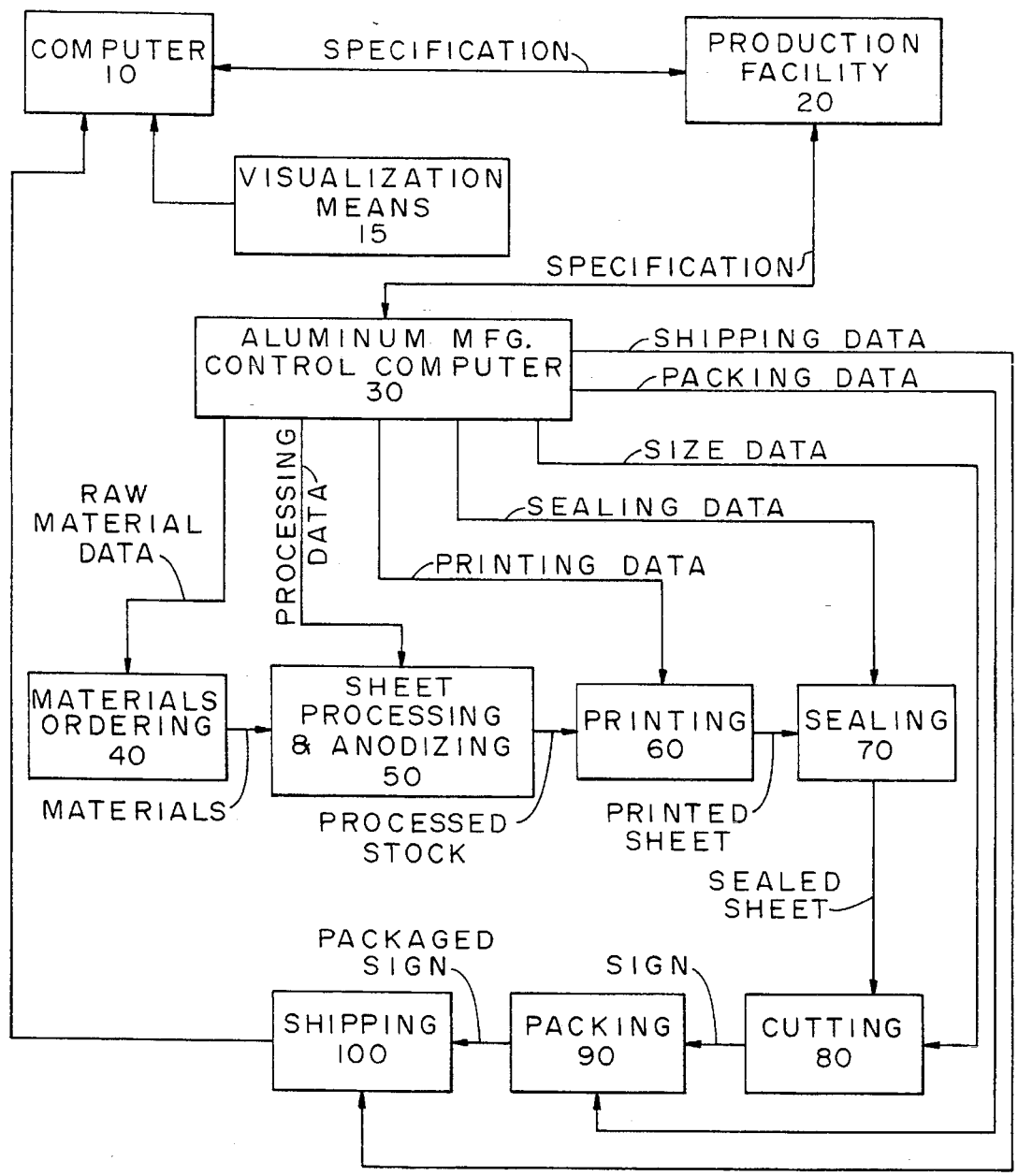
FIG. 1 is a flow chart illustrating the manufacturing process according to a preferred embodiment of the present invention.

The present invention is illustrated in FIG. 1. As shown therein, a computer 10, for example, a PC, workstation, mainframe computer or supercomputer, is used to create a computerized specification of an aluminum article, preferably an anodized aluminum article, including a pattern to be included thereon. Within the context of the invention, the term "pattern" refers to any art work to be reproduced, including text, pictures or a combination thereof.

The specification includes: (1) customer information such as customer identification and location, price, delivery date, and order confirmation; (2) geometric information such as width and length; and (3) art work information providing the graphic details of the pattern. The specification preferably is created using visualization means 15, such as CAD software, but it is envisioned that other means of creating a computerized design may be used. For example, the visualization means may include an analog video camera (not shown) and a digitizer (not shown), such as the 1200 dot per inch ScanMaker IIXE from Microteck, which bit-maps or digitizes the image and stores the image in the memory of the computer. The bit-map can be full color, that is, 24 bit color with 8 bits each of red, blue, green thus creating a palette having $256^3$ or 16.8 million colors.

The computerized specification is sent via modem, facsimile, hardwired network or the like to production facility 20, which may be a manufacturing plant or a printer, for example, which in turn sends the specification to the aluminum manufacturing control computer 30. It should be mentioned that computer 10 may be remote from the production facility or located therein or therewith, and in fact could be incorporated into the manufacturing control computer itself.

The manufacturing control computer 30 controls the formation of the article including, for example, materials ordering 40, processing and anodizing of the aluminum sheet 50, printing 60, sealing 70, cutting 80, packing 90 and shipping 100.

It should be noted that the term "printing" within the context of the present invention includes any means of applying a pattern to the aluminum, including ink jet printing, silk-screening, laser, or hologram, printing, brushing, spray-painting or the like. The pattern may be formed of inks, dies, paints, resins, or the like. Laser color marking, such as disclosed by P. Laakman, "Laser Marking Aluminum in Full Color" *The Fabricator*, pp 42–44, April, 1992, may be used.

One particularly advantageous printing technique for use with the present invention employs a color dot matrix printer, such as a Hewlett-Packard 550C color printer. The color printer uses three colors, cyan, magenta and yellow to reproduce a wide range of colors, the same 16.8 million which can be bit-mapped as described above. By using a color printer, all of the colored dots forming the pattern may be printed at one time in a single pass, in contrast to laser two-step printing such as disclosed by Laakman. The dots are sufficiently small that any two colors may be placed directly adjacent each other without the risk of color blocks intermixing or blending with each other (the intermixing of any two adjacent dots is not significant enough to effect the entire pattern). Moreover, there are no registration problems like those encountered when sequentially printing color blocks (wherein one must ensure that each subsequent color printing is aligned properly with the previous color printing). The color printer is also advantageous in that it prints directly on the article to be produced, without requiring any transfer medium such as is used in aluminum printing methods such as sublimation.

Figure 2:
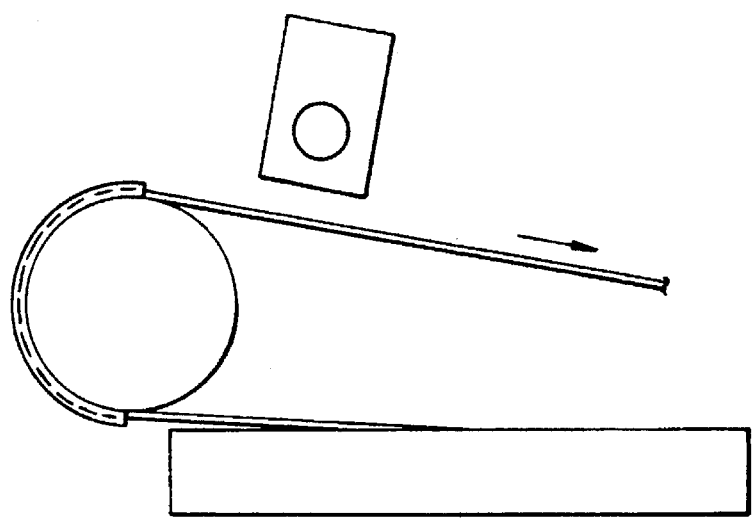
FIG. 2 is a schematic drawing of a color printer according to the prior art.

As shown in FIG. 2, conventional color printers bend the paper to be printed around a guide roller. In order to prevent damage to the metal substrate, such as lateral cracking of the crystal matrix of the aluminum oxide surface due to curling of the sheet during printing, the printer is preferably modified to feed the substrate through the printer in a straight, essentially flat manner. Such a modified printer is shown in FIG. 3, wherein a guide 110 aligns the substrate so that the substrate can be grasped by tension roller 120 and feed roller 130 and directed past the print head 140.

Figure 3:
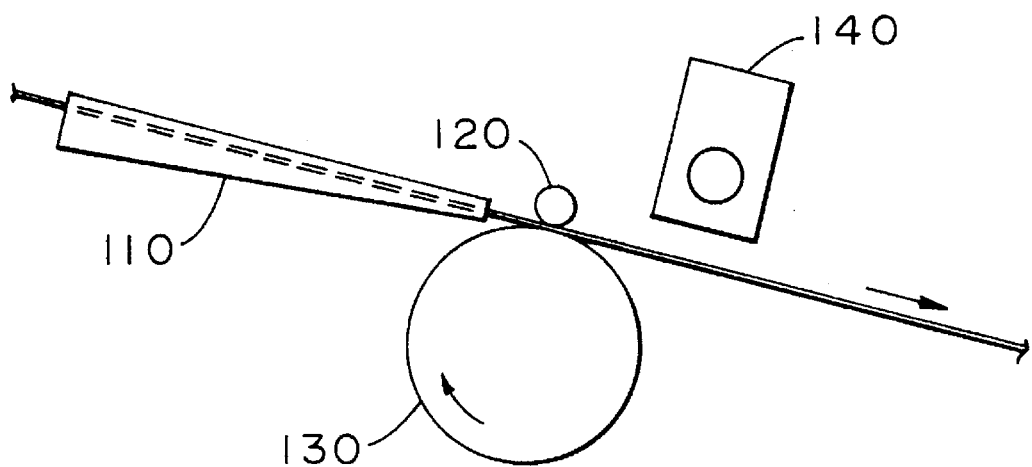
FIG. 3 is a schematic drawing of a color printer modified according to the present invention.

In the application of FIG. 3, the aluminum sheet moves, and the print head needs only to execute a back-and-forth motion across the sheet. The invention is, of course, applicable to the printing of patterns onto three-dimensional surfaces, in addition to a two-dimensional flat sheet. For instance, patterns may be placed onto contoured fenders of automobiles, or into the concave or convex, central areas of vehicle wheels. In the case of three-dimensionally contoured surfaces, it may be advantageous to keep the contoured object fixed and to move the print head under control of a robotic system over the object, in order to print a pattern onto the contoured object. Importantly, the aluminum object should not undergo any bending sufficient to crack or craze the material of the anodized coating, once the object has been anodized.

The step of processing and anodizing the aluminum sheet 50 may include subjecting the anodized aluminum to an acid treatment prior to printing of the pattern. Alternatively, pre-treatment using ammonium bifluoride ($NH_4HF_2$) may be used to etch the sheet and give the surface thereof a slightly "whiter" look. In this case, the sheet is cleaned with an alkaline cleaner and then submerged in a 10% solution of ammonium bifluoride for 10 minutes at room temperature. After the sheet is anodized, it may be treated with nitric acid to open up the pores.

The step of sealing 70 is used to ensure that the pattern remains sharp and bright, and does not deteriorate due to bleeding, leaching, fading or the like. Various techniques for sealing aluminum are known, for example, in S. Wernick et al., *The Surface Treatment and Finishing of Aluminum and its Alloys*, Fifth Ed., Vol. 2, Finishing Publications Ltd., 1987. However, it is also to be noted that the step of sealing may be eliminated, if desired, as long as the pattern is sufficiently apparent and long-lasting for the intended purpose.

The sealing step may utilize conventional inorganic aluminum sealing techniques, such as immersion in boiling water or a boiling solution of nickel acetate or exposure to a superheated system. It is believed that in these processes, water reacts with the anodic aluminum oxide coating to form an aluminum monohydrate which occupies a greater volume than the oxide from which it was formed. This reaction is thought to cause a swelling of the oxide pore wall which closes the pore. In the case of nickel acetate sealing, it is further believed that in addition to hydration of the oxide, nickel is precipitated into the pores of the coating as nickel hydroxide, which is thought to improve corrosion resistance.

Ammonia vapor sealing is another inorganic sealing process which has shown considerable promise. This technique, as disclosed in U.S. Pat. Nos. 4,031,275 and 4,103,048 to Alexander entitled "Low Temperature Sealing of Anodized Aluminum" both of which are commonly assigned herewith, has been found to be particularly advantageous for sealing the pattern within the anodized coating because it prevents bleeding or leaching of the dyes of the pattern from the anodized surface. It is believed that the high quality seal obtained by this technique results from hydration due to basic solution accumulating in the pores of the anodized coating. The basic solution is thought to result from ammonia gas diffusing into water present in the pores of the anodized coating. Furthermore, it is also thought that having small amounts of water vapor present with the ammonia vapor, as in the case of vapors arising from a solution of ammonium hydroxide, can be beneficial in effecting the seal by ensuring that at least some water is present in the anodic oxide coating into which the ammonia gas can diffuse.

An alternative technique for sealing the anodized coating surface is coverage with an organic coating, such as a lacquer or a clear acrylic coating, such as Krylon by Sherwin-Williams Co., or a wax, such as Future floor wax by Johnson Wax Co. or Turtle Wax by Turtle Wax, Inc., or marble sealer such as MultiSeal by Pacific Corp. of Alhambra, Calif. It is believed that such organic coatings penetrate into the pores of the anodized surface to seal the pattern within the anodic coating.

The present invention may be used to form any number of aluminum articles. For example, the present invention may be used to form vehicle panels. Such vehicle panels are not limited to solid colors, but may be multi-colored, with custom striping or nameplates, or full color bit-mapped, where color may change from dot-to-dot or pixel-to-pixel as described above. Nameplates or signs other than for vehicles may also be formed.

The present invention may also be used to decorate a beverage can. With computer-controlled flexible manufacturing, information regarding a sporting event, for example, the daily line-up for a baseball game, can be printed and sealed into an anodized coating on the aluminum can and distributed in time for each game. The present invention could also be used to form aluminum baseball cards or aluminum lawn furniture.

The pattern which can be created according to the present invention is not limited to colorants. It is envisioned that the present invention can be used to print a two-stage resin on an anodized aluminum surface, a different stage being printed on each of a pair of sheets. When the pair of sheets are fitted together in such a way that the adhesive power of the resin is activated, and the non-printed areas are then separated, a three-dimensional object may be formed. For example, the pattern may be used to form the ribs of a radiator or a honeycomb filter.

EXAMPLE 1

1 kg. of the following Aluprint pastes and diluent were obtained from Sandoz Corporation, Charlotte, N.C.:

| | |
|---|---|
| Brown 3R (oil base) | W (water base) |
| Black 3R (oil base) | W (water base) |
| Blue 3R (oil base) | W (water base) |
| Green 3R (oil base) | W (water base) |
| Turquoise 3R (oil base) | W (water base) |
| Yellow 3R (oil base) | W (water base) |
| Red 3R (oil base) | W (water base) |
| Reducer 3R (oil base) | W (water base) |
| Diluent 3R (oil base) | W (water base) |

The color pastes were diluted 1:1 to 1:2 (paste:diluent) and applied to an unsealed anodized coating. Four samples were made, using the following anodizing conditions (wherein "asf" stands for "amps per square foot"):

40 minutes at 12 asf at 70° in 15% $H_2SO_4$ 40 minutes at 12 asf at 80° in 15% $H_2SO_4$ 40 minutes at 12 asf at 70° in 15% $H_2SO_4$ and $HNO_3$ dip 40 minutes at 12 asf at 80° in 15% $H_2SO_4$ and $HNO_3$ dip After brushing on the 14 colorants in replicate, the samples were sealed in $NiAc_2$. After sealing, excess colorant was removed by cleaning with MEK, which is a very aggressive solvent which removed any ink remaining on the surface after the sealing process, and steel wool. This resulted in almost all of the color being clear and bright and retained within the anodized coating. The variations in anodizing conditions had no effect.

EXAMPLE 2

A sheet of anodized aluminum was manually loaded into a Hewlett Packard 7550 flat bed pen plotter. The pens used were felt-tipped and contained a water based ink. The plotter was connected to a Macintosh computer. A test pattern was sent from the computer to the plotter and printed on the anodized aluminum. After printing, the amount of visible ink was good, and the colors were fairly bright.

After printing, the sample was put into a hot nickel-acetate bath for 10 minutes, washed with water and rubbed with fine steel wool. However, most of the ink was removed by the sealing process, so the ink likely did not penetrate the anodized coating.

EXAMPLE 3

A sample was printed using the same set-up as in Example 2, except that the felt-tipped plotter pens were filled with solvent based ink. The amount of visible ink after printing was good, and the colors could be easily seen and were bright.

The sample was then sealed in a hot nickel-acetate bath for 10 minutes, washed with water, rubbed with fine steel wool and rubbed with MEK. Even after washing, the amount of visible ink was good, showing that the solvent based ink penetrated the pores of the anodized coating better than the water based ink used in Example 2.

EXAMPLE 4

A Tektronix Phaser III printer was connected to the Macintosh computer. The ink used in this printer is a wax based ink which is originally loaded into the printer as solid crayons. The crayons are melted internally to 110° C. in a holding chamber, At the time of printing, the hot wax is transported to a jet where its temperature is increased to 140° C. just before being sprayed. The colors of the resultant printed image were good and bright, and the boundaries between the printed image and the bare sheet were sharp compared to the sample printed in Examples 2 and 3.

The sample was then sealed as in Example 3. After sealing and cleaning, some color was left but it was diminished from the original. The boundaries between the printed image and the bare sheet were still sharp and clear.

EXAMPLE 5

A sample was printed using the same set-up as in Example 4, except that an image was digitized using a Radius Audio Video Input Processor. The images were stored in a Microsoft Word document on floppy disks. Two copies of the image were printed onto anodized aluminum lithographic sheets using the Phaser III printer. One of these sheets was then sealed with nickel-acetate and cleaned with MEK and fine steel wool. The other was heated to 150° C. for 5 minutes, cooled and then sealed with nickel-acetate and cleaned with MEK and fine steel wool. More of the original printing was left in the second sheet.

EXAMPLE 6

A Hewlett Packard Desk Writer 550C color printer was connected to the Macintosh Computer. The Macintosh had a Radius Audio and Video Input Processor connected thereto which allows capturing, storing and printing of images from video sources. A software product, SuperPaint 3.0 was installed to create, store and print images. Images digitized using the Radius hardware can be inserted into SuperPaint to be edited, annotated and/or printed.

Several sheets of anodized lithograph sheet were printed, sealed with nickel-acetate and cleaned with MEK and fine steel wool. The inks used in the printer were water soluble dyes that are insoluble when dry. The results of the printing were good.

EXAMPLE 7

The HP 550C printer was modified to that the anodized aluminum sheet can feed flat through the printer. This modification eliminated several problems: (1) lateral cracking of the crystal matrix of the aluminum oxide surface due to curling of the sheet for feeding; (2) the non-uniform feeding of the sheet as it passed through the printer; and (3) the bouncing of the sheet as it passed by the print head. Subsequent print tests showed that the art work was much more uniform, and that no marks were formed due to lateral cracking of the aluminum oxide crystals, non-uniform feeding of the sheet or bouncing of the sheet.

EXAMPLE 8

A metal surface was pre-treated with ammonium bifluoride. First, the sheet was cleaned with an alkaline cleaner. Then the sheet was submerged in a 10% solution of ammonium bifluoride for 10 minutes at room temperature. The sheet was then anodized and treated with nitric acid to open up the pores. This resulted in a surface with a "whiter" appearance more suitable for some applications.

EXAMPLE 9

A picture was digitized using a video system which digitizes the images at 72 dots per inch, and printed using the HP 550C printer which prints 300 dots per inch. Subsequently the same picture was digitized using a 1200 dot per inch ScanMaker IIXE by Microteck, and then printed using the HP 550C printer. The increase in the quality of the input image was reflected in the quality of the printed image.

EXAMPLE 10

Experiments were conducted using different wax sealers. Two types of wax were applied to the printed anodized aluminum surface, Future floor wax from Johnson Wax and Turtle Wax furniture polish from Turtle Wax, Inc. Both waxes were found to remove a significant amount of ink in the initial application of the wax. The surface did, however, appear to be sealed after the application of both waxes.

EXAMPLE 11

Further experiments were conducted using marble sealer as a sealant. A single coat of MultiSeal by Pacific Corporation of Alhambra, Calif. was applied to a printed anodized aluminum sample. There was no loss of ink caused by the application of the sealer. After drying, the sample appeared to be sealed.

Chemical analysis of the sealant indicated the presence of a mixture of C8 through C12 branched hydrocarbons, toluene, acetone, three isomers of xylene and diacetone alcohol. A mixture of C20 through C30 straight chain hydrocarbons similar to paraffin wax were also detected. Spectroscopic analysis showed evidence of polyacrylate and/or polyamethacrylate, and possibly polyethylacrylate.

Thus, it appears that the sealant is a petroleum based wax that has been dissolved in the solvents toluene and acetone. As the solvent evaporates, the wax agglomerates into small balls which appear to grow. It is considered that this action leads to good plugging of the pores of the anodized coating to effect the seal.

EXAMPLE 12

Further experiments were conducted using ammonium vapors to seal the anodized coating, as described in U.S. Pat. Nos. 4,031,275 and 4,103,048 to Alexander. The printed aluminum oxide surface was exposed to ammonium vapors for 30 minutes. The sample was then rubbed with a cloth damp with water, causing significant loss of ink which indicated that there was little, if any, sealing of the sample. However, when a sample was subjected to the vapors overnight, there was only a slight change in the appearance of the sample. A stain test was done, the results of which indicated that a very good seal was produced.

Further experiments were conducted wherein the sample was subjected to ammonium vapors heated to 125° F. for 10 minutes. The result was a 95% loss of ink from the printed sample.

The above is for illustrative purposes only. Modification may be made within the scope of the invention as defined by the appended claims.

We claim:

1. A computer automated flexible manufacturing system, comprising:

visualization means for creating a computerized design specification of an aluminum article of manufacture, the computerized design information including a specification of a material for the aluminum medium, size information for the aluminum article of manufacture, packaging instructions and shipping information for the aluminum article of manufacture upon completion; and a manufacturing computer, remote from the visualization means, connected to the visualization means to receive the computerized design specification; and a printing unit operating under control of the manufacturing computer, the printing unit receiving an aluminum medium and printing a pattern on the aluminum medium as specified by the computerized design specification to produce the aluminum article of manufacture, wherein the manufacturing computer orders the aluminum medium, controls pre-printing processing of the aluminum medium prior to presentation to the printing unit, controls post-printing processing of the aluminum article and controls shipping of the article of manufacture.

2. A system as recited in claim 1, wherein the pre-printing processing includes anodizing the aluminum medium and the post-printing includes cutting and sealing the aluminum medium.

\* \* \* \* \*